Dec. 4, 1951   R. L. COULTRIP   2,577,608
PRESSURE GAUGE
Filed Aug. 15, 1946   2 SHEETS—SHEET 1
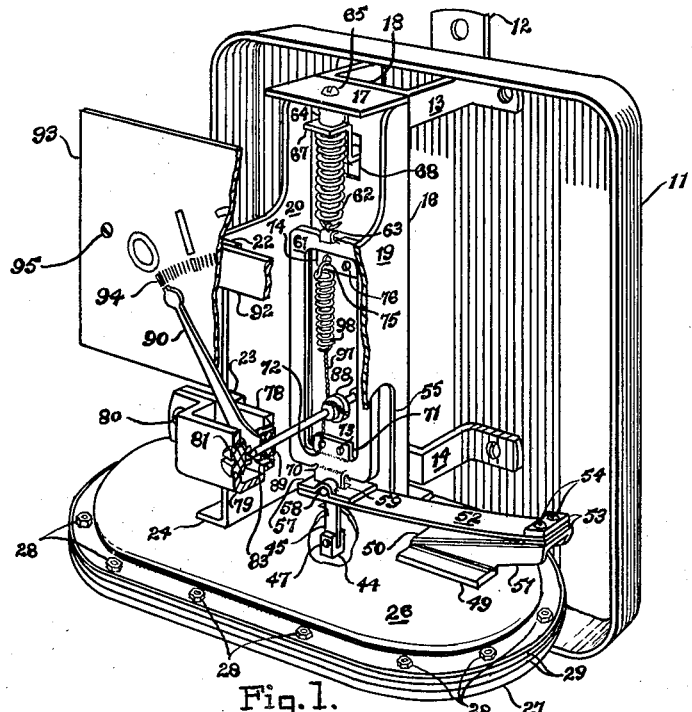
Fig. 1.
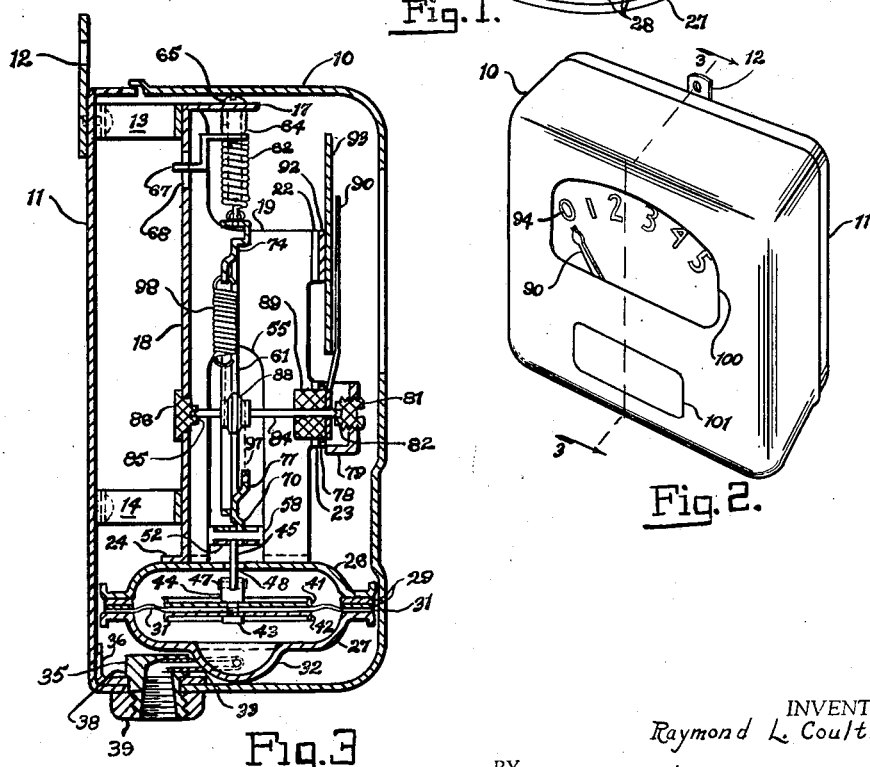
Fig. 2.
Fig. 3
INVENTOR.
Raymond L. Coultrip
BY Kimball & Wyman
ATTORNEY.

Dec. 4, 1951     R. L. COULTRIP     2,577,608
PRESSURE GAUGE

Filed Aug. 15, 1946     2 SHEETS—SHEET 2

INVENTOR.
Raymond L. Coultrip
BY
Kimball A. Wyman
ATTORNEY

Patented Dec. 4, 1951

2,577,608

UNITED STATES PATENT OFFICE 2,577,608

PRESSURE GAUGE

Raymond L. Coultrip, Milwaukee, Wis.

Application August 15, 1946, Serial No. 690,669

3 Claims. (Cl. 73—408)

This invention pertains to instruments or gages such as may be used to indicate a force or quantity, for example air pressure, to which the instrument is subjected.

The principal object of this invention is to provide an improved gage embodying parts constructed and combined in a manner permitting the gage to be readily assembled or modified to effectively indicate either a positive or a negative value of condition, such as pressure.

Another object of this invention is to provide an improved gage which when assembled to indicate either a positive or a negative value of a condition can be readily modified to indicate the opposite value of the condition with a minimum of time, effort, skill, and expense.

Another object of this invention is to provide an improved gage construction simplifying and minimizing the number of parts required for effectively indicating either a positive or a negative value of a condition, and to the greatest possible extent utilizing identical parts for rendering the gage effective to indicate either value of the condition.

Another object of this invention is to provide a gage wherein the simplicity of construction and small number of moving parts keep the bearing friction relatively small and thus provide for a minimum hysteresis or lost motion error.

A further object of this invention is to provide an improved gage wherein a flexible member connecting the diaphragm actuated element and condition indicating pointer shaft is under a fixed spring tension resulting in a relatively small load of constant magnitude on the indicator pointer shaft bearings.

Still another object of this invention is to provide an improved gage embodying parts constructed and combined in a manner affording a simplified and extremely durable instrument which can be readily manufactured, assembled, and serviced with a minimum of time, effort, and expense.

Other objects will be apparent from the following description and the appended claims.

In the drawing:

Fig. 1 is a perspective view of a pressure gage instrument embodying the invention, with the front cover removed and with internal portions cut away to better show the construction;

Fig. 2 is a perspective view of the pressure gage shown in Fig. 1, with the front cover in place;

Fig. 3 is a sectional view taken on line III—III of Fig. 2;

Figure 4:
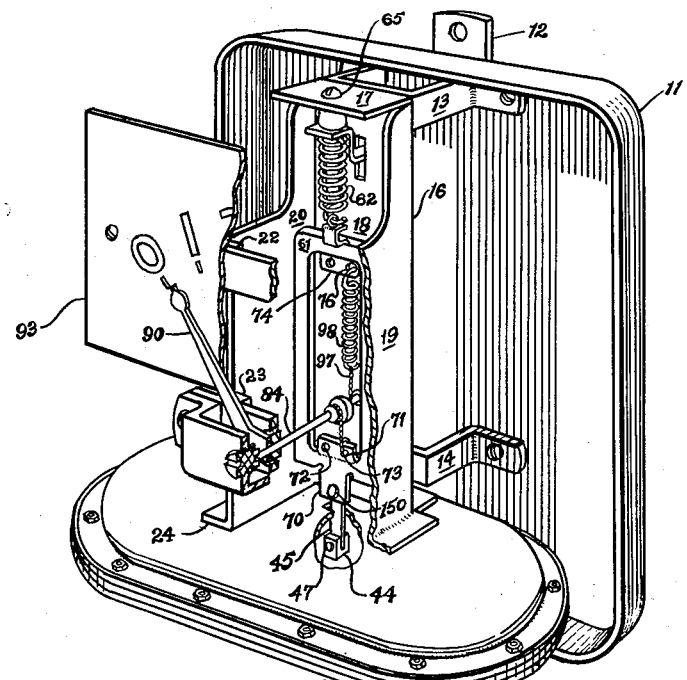
Fig. 4 is a view similar to Fig. 1 showing the instrument modified to function as a draft gage.

Referring to Figs. 1 and 3, it will be seen that the gage is enclosed in a casing comprising a front cover 10 detachably mounted on a base 11 provided with a mounting lug 12 for attaching the gage to a suitable support (not shown). Base 11 is provided with a pair of U-shaped brackets 13 and 14 having outwardly flanged legs screwed to the mounting base 11. Rigidly fastened to the brackets 13 and 14 by any suitable means is an essentially channel-shaped member 16 having an upper end wall 17 disposed at a right angle with respect to web portion 18 and having irregularly shaped side walls 19 and 20 each provided with a pair of similarly arranged upper and lower inwardly bent over portions 22 and 23 (only the pair on wall 20 is shown in Figs. 1 and 4) disposed in spaced and generally parallel relation with respect to web portion 18. The bottom edge of channel-shaped member 16 terminates in an outwardly flanged foot portion 24 which is supported by and rigidly fastened by any suitable means to flanged dish member 26. A similar or complementary flanged dish member 27 is secured to member 26 by means of bolts 28 which pass through the flanges of both dish members, through a pair of gasket members 29, and through the peripheral portion of a flexible diaphragm 31 disposed between the flanges of the dish members in sealing relation thereto. Member 27 is preferably formed with a depressed center portion 32 providing a well or sump which is connected by a tube 33 with a fluid inlet opening 34 formed in an externally threaded pipe connector 35 which extends through an opening in the bottom wall of the casing and through an aligned opening in a rigid bracket 36 secured in any suitable manner to the mounting base 11. Connector 35 is provided with an external shoulder 38 abutting an inner surface of bracket 36 and is firmly secured to the bracket 36 and adjacent portions of the gage casing by means of a clamping nut 39.

The central portion of flexible diaphragm 31 is reinforced by a pair of rigid disc members 41 and 42 securely clamped to opposite sides of the central portion of the diaphragm 31 by means of a bolt 43 which extends therethrough and a clamping nut 44. Nut 44 is notched to receive a flat link member 45 which is secured to the nut 44 by a pivot pin 47. Link member 45 extends freely through a central opening 48 (see Fig. 3) in the upper dish member 26. Upper dish member 26 mounts a spring support (see Fig. 1) comprising an abutting base portion 49 fixedly secured thereto in any suitable manner, and an upwardly extending portion or arm 50 provided with downturned reinforcing edge flanges 51. A resilient strip 52 has one end thereof fixedly secured to the outer or free end of arm 50 by means of clamping pads 53 and bolts 54 and extends therefrom through an opening 55 in channel side wall 19 and to a point in proximity to link 45. The free end of strip 52 fixedly mounts a member 57 having a transversely extending bead adapted to receive a pin 58. Beaded member 57 and strip 52 are provided with an elongated opening 59 which extends through longitudinally of the strip 52 and transversely with respect to the pin-receiving bead on member 57 and adapted to freely receive the upper end portion of link 45.

An elongated, generally rectangular yoke 61 is supportedly suspended from the upper end wall 17 of channel member 16 by means of a tension spring 62 having its lower end attached to a tab 63 on the upper end of yoke 61, and having its upper end secured to an internally threaded part 64 carried by an adjusting screw 65 passing through a hole in wall 17 of a diameter somewhat less than the diameter of the screw head. Screw 65 extends freely through most of the spring coils to prevent buckling of the spring 62. Part 64 is prevented from turning when screw 65 is turned by means of a Z-shaped member 67 having one end secured to part 64 and having its other end projecting through an elongated generally rectangular opening 68 in the back wall or web portion 18 of the channel member 16. The lower end of yoke 61 is provided with a depending tab 70 which is slightly offset outwardly from the plane of the yoke 61 and extends freely through elongated opening 59 in strip 52 and member 57 in side opposed abutting relation with respect to the upper end portion of link 45. Tab 70 and link 45 have openings therethrough alignable with each other and with the beaded portion of member 57 and are thus secured together and to the free end of strip 52 by inserting pin 58 therethrough as indicated. It should now be obvious that the tension of spring 62 and the force transmitted through the yoke 61 to spring strip 52 and diaphragm 31 can be readily varied by appropriately turning screw 65 to produce either an upward or downward guiding movement of part 64.

The base or lower end of yoke 61 is provided with an upwardly extending tab 71 slightly offset outwardly from the plane of yoke 61 and having two holes therein adjacent the top thereof. The upper end of yoke 61 is provided with a downwardly extending tab 74 which extends slightly to the rear of the plane of the yoke 61 and has two holes 75 and 76 therein generally aligned with the holes 72 and 73 in tab 71. A rigid bar 78 extends transversely of channel member 16 and is fixedly secured in any suitable manner to the opposed bent over portions 23 of the side walls 19 and 20 of the channel shaped member 16. A rigid member 79 L-shaped in cross section, as shown in Fig. 3, is provided with inwardly offset end flanges disposed in abutting relation against and secured to opposite end portions of bar 78 by means of bolts 80 or the like. The vertical wall portion of member 79 is provided with a threaded opening therethrough mounting a set screw 81 having a recessed inner end providing a bearing surface 82. Bar 78 has a relatively large opening 83 therethrough aligned with set screw 81, through which extends a shaft 84 having a pointed end supported in bearing surface 82 and having its opposite pointed end supported in a recessed bearing surface 85 formed in a button 86 fixed in an aligned opening through the web portion 18 of channel shaped member 16. Adjusting screw 81 will result in varying the frictional force tending to oppose rotation of the pointed shaft 84 and in addition compensates for small variances in the size or spacing of the gage parts. Rigidly fastened to an intermediate portion of shaft 84 is a drum 88 having front and rear portions of smaller diameter than the central portion. Drum 88 is so positioned on shaft 84 that the front portion of the drum lies generally in the plane of upwardly extending tab 71 and so that the rear portion of the drum lies generally in the plane of the downwardly extending tab 74. A hub 89 having a diameter somewhat less than the diameter of the hole 83 in bar 78 is rigidly fastened to the shaft 84 near its front end, and a pointer arm 90 is rigidly secured to the front face of the hub 89 in any suitable manner. It should therefore be obvious that the pointer arm 90 moves angularly with shaft 84 as the latter is rotated.

A transversely extending bar 92 is fastened in any suitable manner to the opposed bent over portions 22 of the channel side walls 19 and 20. A plate 93 provided with a suitable scale 94 is detachably secured to bar 92 as by means of screws 95 with the scale 94 disposed in operative coaction with pointer arm 90. A finely linked chain 97 has one end fastened to the upwardly extending flange 71 by means of the left hand opening 72 therein (see Fig. 1) and then passes clockwise (see Fig. 1) around the front portion of the drum 88, across the central portion of the drum, to the rear portion thereof, from which it passes upward toward and is attached to the lower end of a coiled tension spring 98 having its upper end attached to downwardly extending tab 74 through the left hand opening 75 therein (see Fig. 1). The spring 98 serves to hold the chain 97 in tensioned engagement with drum 88 at all times, thus minimizing the lost motion therein.

Referring now to Fig. 2, in which the pressure gage is shown with the front cover 10 in place, it will be noted that the cover is provided with an elongated opening 100 therethrough exposing the disc markings or scale 94 and the upper end portion of the pointer arm 90. A name plate or other identifying marking may be attached to an indented portion 101 in the front cover 10.

The operation of the pressure gage will now be more fully described. When the pressure gage inlet 34 is at atmospheric pressure, the pressures above and below the diaphragm 31 are equal. Under these conditions resilient strip 52 tends to move the yoke 61 downwardly against the upward biasing force of tension spring 62. In calibrating the gage, the spring 62 is adjusted by means of screw 65 so that the upwardly and downwardly acting forces on yoke 61 are equal when pointer arm 90 is at the zero marking on the scale 94 and the pressure on both sides of the diaphragm 31 is at atmospheric pressure. With the gage thus calibrated, an increase in the pressure of the fluid in gage inlet 34 produces an unbalanced upwardly acting force due to the fact that the pressure acting on the upper side of the diaphragm 31 is atmospheric and therefore substantially constant. Consequently the disc members 41 and 42, the link 45, and the yoke 61 are subjected to an upwardly acting force which is proportional to the difference in fluid pressure acting on the upper and lower sides of diaphragm 31. As a result, the disc members 41 and 42, link 45, and yoke 61 move upwardly an amount proportional to the difference in the pressures above mentioned, and through frictional engagement of chain 97 with drum 88 causes a clockwise rotation of shaft 84 and an angular clockwise movement of the pointer arm 90, as viewed in Fig. 1, an amount proportional to the difference in pressure above and below the diaphragm 31. The scale of the index marking 94 may be so chosen that angular movement of the pointer arm 90, or pressure increase, may be read directly in any convenient units, such as pounds per square inch. Upon a decrease in pressure at the gage inlet 34 the total upward force on the disc members 41 and 42 and the yoke 61 is proportionately reduced, thus causing the disc members 41 and 42, link 45, and yoke 61 to move downwardly an amount proportional to the pressure decrease. This downward movement of the yoke 61 results in counter-clockwise rotation of the drum 88 and counter-clockwise angular movement of the pointer arm 90, as viewed in Fig. 1, an amount proportional to the pressure decrease.

Figure 5:
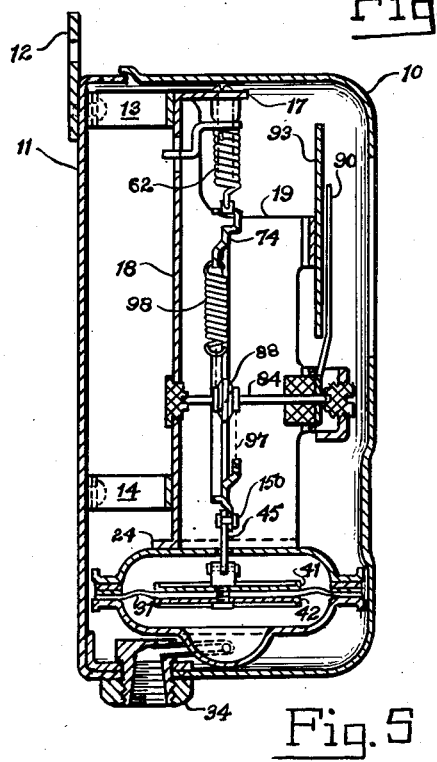
Fig. 5 is a view similar to Fig. 3 of the draft gage construction shown in Fig. 4.

Referring now to Figs. 4 and 5, it will be seen that these two figures show a gage construction similar to the pressure gage previously described, but modified in such a manner as to allow its utilization as a draft gage. The construction and arrangement of parts shown in Figs. 4 and 5 are in general identical to those previously described in connection with Figs. 1, 2, and 3, and therefore the same numerals have been employed to designate identical or like parts in the interest of simplicity. In this modified construction the resilient strip 52 and support therefor are omitted and link 45 is connected to depending yoke tab 70 by means of a pin 150. In addition, chain 97 is fastened to yoke tab 71 by means of the right hand hole 73 therein (see Fig. 4) and then passes counter-clockwise around the front portion of the drum 88 across the central portion of the drum 88 to the rear portion thereof, from which it passes upward toward and is then attached to the lower end of coiled tension spring 98. The other end of tension spring 98 is fastened to depending tab 74 on the upper portion of the yoke 61 by means of the right hand hole 76 in the tab 74. Thus it will be seen that the draft gage shown in Figs. 4 and 5 differs from the pressure gage shown in Figs. 1, 2, and 3 only in that the draft gage is not provided with a resilient strip biasing the yoke downwardly, in that chain 97 is secured to the right hand set of holes in the opposed yoke tabs (see Fig. 4), and in that chain 97 is wound counter-clockwise about drum 88.

The operation of the draft gage will now be more fully described. When the pressure at the gage inlet 34 is at atmospheric pressure, e. g., the draft is zero, the pressures above and below the diaphragm 31 are equal. In calibrating the draft gage, the adjustable spring 62 is adjusted by means of screw 65 so that the pointer arm 90 is at the zero marking when the pressure on both sides of the diaphragm 31 is atmospheric. When the gage is thus calibrated an increase in draft results in a decrease in the pressure of the fluid in gage inlet 34 and therefore the pressure acting on the under side of diaphragm 31. The pressure above the diaphragm 31 is atmospheric and therefore substantially constant, thereby subjecting the diaphragm 31 to a downwardly acting unbalanced force which is transmitted to yoke 61 through disc members 41 and 42 and the link 45. This unbalanced force is proportional to the difference in the pressures acting on the upper and lower sides of the diaphragm 31, and causes the disc members 41 and 42, link 45, and yoke 61 to move downwardly an amount proportional to the pressure difference through the frictional engagement of chain 97 with drum 88. The downward movement of yoke 61 causes a clockwise rotation of the shaft 84 and a corresponding clockwise movement of the pointer arm 90, as viewed in Fig. 4, proportional to the difference in pressure above and below diaphragm 31. The scale on the plate may be so chosen that the angular movement of the pointer arm 90 will directly indicate the amount of draft in any convenient units, such as inches of water. Upon a decrease in draft, the unbalanced force acting downwardly on diaphragm 31 and yoke 61 is proportionally reduced, thus causing the disc members 41 and 42, link 45, and yoke 61 to move upwardly an amount proportional to the draft decrease. This upward movement of the yoke 61 results in a counter-clockwise rotation of the drum and in a corresponding counter-clockwise angular movement of the pointer arm 90, as viewed in Fig. 4, an amount proportional to the draft decrease.

Should the pressures to be measured require it, the pressure gage may also be utilized without the resilient strip 52 which can easily be removed by removing screws 54 and clamping pads 53 and withdrawing pin 58 and reinserting it through the link 45 and the downwardly extending tab 70 only.

The advantages secured with respect to the manufacture, assembly, and calibration by the identity of parts between the draft and pressure gages are evident.

From the foregoing it may be seen that there is provided a pressure and draft gage of simple construction, easily calibrated and with a minimum of construction differences between the two. In addition, it should be apparent that certain of the features of construction and certain of the combination of parts herein disclosed are applicable to gages other than the draft and pressure gages above mentioned and that apparatus embodying the invention may vary considerably from that herein shown and described for purposes of illustration. It should therefore be understood that it is not intended to limit the invention to the exact construction and/or combinations of elements shown and described herein, as various modifications within the scope of the appended claims may occur to persons skilled in the art.

What is claimed is:

1. A gage comprising a movable condition responsive element, a shaft supported for rotation and having associated therewith a condition indicator, an adjustable spring spaced from said condition responsive element, connecting means connecting said condition responsive element and said adjustable spring and movable linearly in response and proportional to movements of the former, said connecting means comprising a yoke, extending above and below said shaft, elongated spring tensioned means having an intermediate portion wound around said shaft and having one end attached to the portion of the yoke below said shaft and its other end attached to the portion of the yoke above said shaft, and spaced means on each of said portions of the yoke for alternately attaching the ends of said spring tensioned means when said spring tensioned means is wound in one or the other direction around said shaft.

2. In a pressure indicating device, a pressure responsive diaphragm, indicating means for indicating pressure values including a rotatable shaft with a drum mounted thereon, an adjustable spring, connecting means connecting said diaphragm and said adjustable spring, said connecting means including a yoke member disposed in substantially surrounding relation to and in alignment with said drum, means for translating linear movement of said yoke into rotational movement of said drum including elongated flexible means having an intermediate portion associated with said drum and having one end attached to the portion of the yoke below said drum and its other end attached to the portion of the yoke above said drum, and spaced means on each of said portions of the yoke for alternately attaching the ends of said spring tensioned means when said spring tensioned means is wound in one or the other direction around said shaft.

3. A gage having a frontal cover plate and comprising a movable condition responsive element, a spring spaced from said condition responsive element, connecting means capable of linear movement by said element comprising a yoke lying in a plane substantially parallel to said cover plate and connecting said spring and said condition responsive element, a condition indicator including a rotatable shaft with a drum mounted thereon, said drum being supported within the yoke and lying substantially within said plane of the yoke with its axis of rotation extending perpendicular to said plane, and means for translating linear movement of said connecting means into rotational movement of said drum comprising elongated flexible means having an intermediate portion wound around said drum and having one end attached to a portion of the yoke above said drum and its other end attached to a portion of the yoke below said drum.

RAYMOND L. COULTRIP.

REFERENCES CITED

The following references are of record in the file of this patent:

UNITED STATES PATENTS

| Number | Name | Date |
| --- | --- | --- |
| 1,201,140 | Bode | Oct. 10, 1916 |
| 1,593,890 | Welch | July 27, 1926 |
| 2,186,553 | Linde et al. | Jan. 9, 1940 |

FOREIGN PATENTS

| Number | Country | Date |
| --- | --- | --- |
| 8,850 | Great Britain | May 3, 1893 |
| 252,470 | Great Britain | June 3, 1926 |